United States Patent [19]

Malloy Desormeaux

[11] Patent Number: 4,687,311
[45] Date of Patent: Aug. 18, 1987

[54] FILM-ON-SPOOL SENSOR FOR CONTROLLING FRAME COUNTER

[75] Inventor: Stephen G. Malloy Desormeaux, Rochester, N.Y.

[73] Assignee: Eastman Kodak Company, Rochester, N.Y.

[21] Appl. No.: 861,387

[22] Filed: May 9, 1986

[51] Int. Cl.⁴ ............................................. G03B 17/36
[52] U.S. Cl. ................................................... 354/217
[58] Field of Search ................................ 354/217, 218

[56] References Cited

U.S. PATENT DOCUMENTS

| | | | |
|---|---|---|---|
| 3,380,364 | 4/1968 | Bethmann | 95/31 |
| 3,947,861 | 3/1976 | Kimura et al. | 354/217 |
| 4,021,828 | 5/1977 | Iura et al. | 354/217 |
| 4,494,842 | 1/1985 | Kimura et al. | 354/173.11 |

Primary Examiner—Michael L. Gellner
Attorney, Agent, or Firm—Roger A. Fields

[57] ABSTRACT

In a photographic camera, a film-on-spool sensor enables a frame counter in response to sensing the presence of film on a take-up spool and disables the counter in response to sensing the absence of film on the spool. An initializing device resets the frame counter to an original empty setting whenever the counter is disabled. If a rear door of the camera is accidentally or inadvertently opened with the film in midroll, the film-on-spool sensor sensing the presence of film on the take-up spool prevents the frame counter from being disabled and, therefore, prevents the counter from being reset by the initializing device. This allows the frame counter to continue its frame count after the door is re-closed should the photographer wish to use any unexposed frames remaining on the film.

8 Claims, 4 Drawing Figures

FILM-ON-SPOOL SENSOR FOR CONTROLLING FRAME COUNTER

CROSS-REFERENCE TO A RELATED APPLICATION

Reference is made to commonly assigned, copending U.S. Pat. application Ser. No. 829,748, entitled FILM-ON-SPOOL SENSOR FOR PREVENTING INITIALIZATION OF FRAME COUNTER, and filed Feb. 18, 1986 in the name of Stephen Malloy Desormeaux.

BACKGROUND OF THE INVENTION

1. Field of the Invention

The invention relates generally to the field of photographic cameras and in particular to those cameras which have a frame counter for indicating the number of frames exposed or remaining to be exposed on a filmstrip in the camera.

2. Description of the Prior Art

Typically in many recent 35 mm cameras, there is included a motorized film transport mechanism. In operation, a leading end portion of the filmstrip extending from a light-tight cartridge loaded in the camera is attached automatically to a take-up spool. The take-up spool is rotated after each exposure to advance successive frames of the filmstrip from the cartridge across the focal plane of a taking lens and onto the take-up spool. Each time the take-up spool is rotated, an unexposed frame on the filmstrip is located in the focal plane of the taking lens and the exposed frame is wound onto the take-up spool. When the fresh film supply has been exhausted, a trailing end portion of the filmstrip remains attached to a supply spool within the cartridge. The end of film condition is signalled by a sudden rise in the film tension as the take-up spool attempts to withdraw the remainder of the filmstrip from the cartridge. A tension sensing mechanism responds to this increase in film tension by reversing the motor drive to rotate the supply spool within the cartridge. The rotated spool draws the exposed film off the take-up spool and rewinds it into the cartridge. Then, a rear door of the camera is opened and the cartridge is removed in order to process the filmstrip.

Opening the rear door of the camera to remove the cartridge usually initializes a frame counter to an original empty setting. When a cartridge with a fresh filmstrip is loaded in the camera and the door is re-closed, the frame counter is incremented from its empty setting to a "1" setting in response to advance of the filmstrip to locate the first frame in the focal plane of the taking lens. Failure to initialize the frame counter to its empty setting would result in the frame count being out of synchronization with the exposed frames on the filmstrip.

If the rear door of the camera is accidentally or inadvertently opened before the filmstrip is completely exposed or before it is substantially rewound back into the cartridge, the exposed frames on at least the outermost convolution of the filmstrip on the take-up spool will be ruined. To prevent this occurance, cameras have been recently provided with a motorized transport mechanism which pre-winds the filmstrip onto the take-up spool before any exposures are taken. Then, after each exposure, the filmstrip is rewound incrementally into the cartridge. Thus, the exposed frames will be protected within the cartridge should the rear door be opened prematurely.

A frame counter in a camera that pre-winds a fresh filmstrip onto the take-up spool and rewinds the filmstrip incrementally into the cartridge after each exposure is driven by film movement in both the pre-wind and rewind directions. When the filmstrip is moved in the pre-wind direction, the counter is incremented to indicate the maximum number of available exposures. Conversely, movement of the filmstrip in the rewind direction decrements the counter after each exposure to indicate the remaining number of available exposures. Opening the rear door of the camera accidentally or inadvertently before the filmstrip is completely wound off the take-up spool will initialize the counter to its empty setting. This may be considered undesireable, since the counter cannot continue its frame count after the door is re-closed should the photographer wish to use any unexposed frames of the filmstrip remaining on the take-up spool.

It has been suggested in commonly assigned U.S. Pat. No. 3,511,153, granted May 12, 1970, that a frame counter not be initialized to its empty setting in the event the rear door of the camera is opened before the filmstrip is completely rewound into the cartridge. Specifically, rotation of the counter to increment or decrement the counter is prevented by arresting a metering sprocket in a predetermined angular position. The metering sprocket is connected to the counter and has teeth engagable with successive perforations in the filmstrip to rotate the sprocket and the counter during film movement. However, with this arrangement, the counter cannot be initialized except by rotating the counter manually to its empty setting.

THE CROSS-REFERENCE APPLICATION

The commonly assigned, copending patent application cross-referenced above discloses a frame counter which operates in a camera during movement of a filmstrip from a film cartridge onto a take-up spool or back into the cartridge to provide a count of exposed or unexposed frames on the filmstrip. An initializing mechanism responsive to the opening of a door to remove the cartridge from the camera initializes the frame counter to an original empty setting. If however the door is accidentally or inadvertently opened with the filmstrip in midroll, a film-on-spool sensor sensing the presence of the filmstrip on the take-up spool prevents the initializing mechanism from initializing the counter. This allows the counter to continue its frame count after the door is re-closed should the photographer wish to use any unexposed frames remaining on the filmstrip.

In the cross-referenced application, as well as in the prior art, closing the door of the camera enables the frame counter to permit it to provide a frame count. Conversely, opening the door will disable the frame counter to prevent it from providing a frame count. Typically, at least in mechanical type counters, the frame counter must be disabled before it can be reset to an original empty setting by the initializing mechanism. This is done to prevent an erroneous resetting of the counter.

SUMMARY OF THE INVENTION

The above-described problems regarding prior art frame counters in photographic cameras are believed to be solved by the invention. Moreover, the invention is believed to be an improvement over the counter mechanism disclosed in the cross-referenced application. Pursuant to the invention, opening the rear door of the camera is eliminated as a prerequisite to disabling the frame counter and to initializing the counter. The frame counter is simply disabled and initialized in response to a film-on-spool sensor sensing the absence of film on a take-up spool. Conversely, the film-on-spool sensor will prevent the frame counter from being disabled and initialized whenever film is present on the take-up spool. Thus, according to the invention, the film-on-spool sensor operates to provide several functions, e.g., to prevent unintended initialization of the frame counter should the rear door be accidentally or inadvertently opened with the film in midroll, and to disable and initialize the counter whenever the spool is emptied. This results in a more reliable, less costly assembly having fewer parts than in the prior art or the cross-referenced application.

BRIEF DESCRIPTION OF THE DRAWINGS

The invention will be described in connection with the drawings, wherein.

DESCRIPTION OF THE PREFERRED EMBODIMENT

Figure 1:
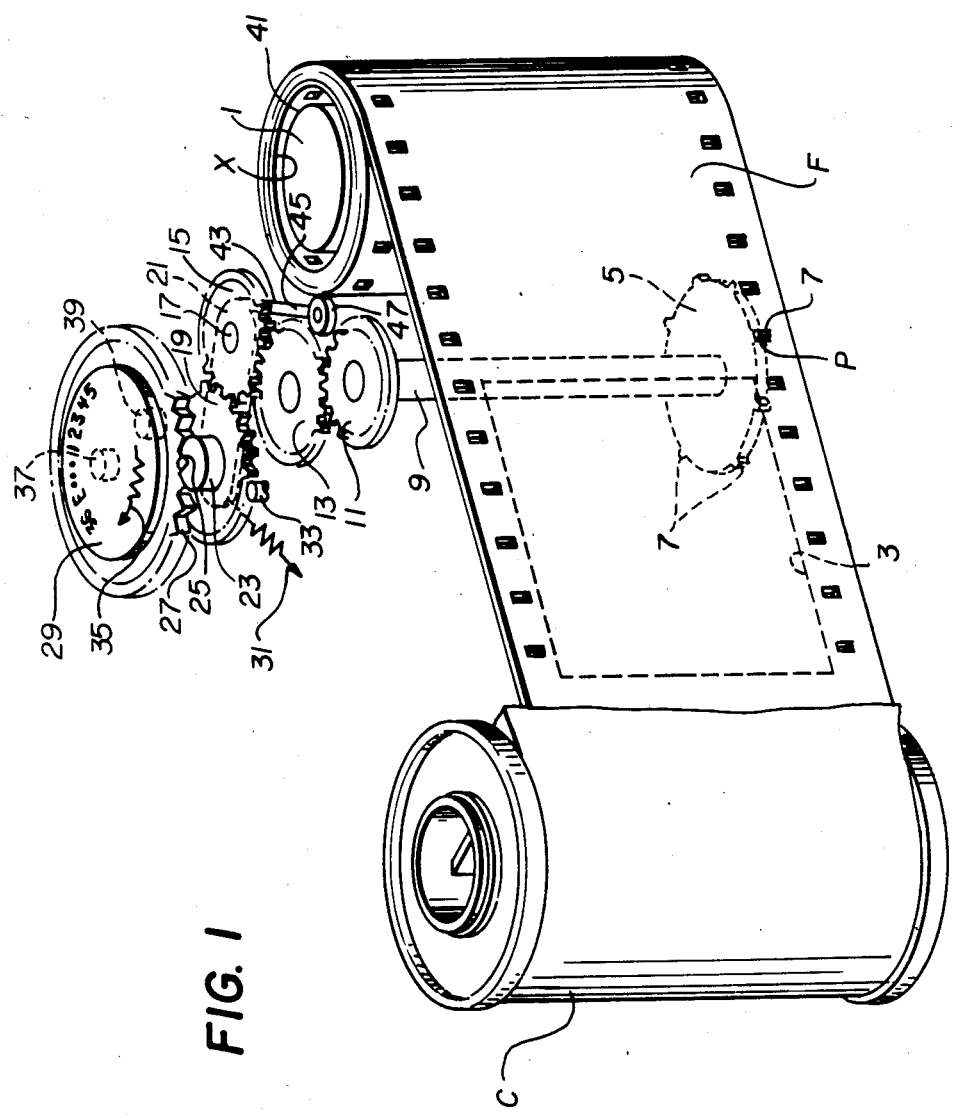
FIG. 1 is a perspective view of camera apparatus including a frame counter for counting exposed or unexposed frames on a filmstrip and a film-on-spool sensor for preventing initialization of the counter whenever the filmstrip is wound on a take-up spool, in accordance with a preferred embodiment of the invention.

The invention is disclosed as being embodied preferably in a 35 mm camera. Because the features of this type camera are well known, the description which follows is directed in particular to photographic elements forming part of or cooperating directly with the disclosed embodiment. It is to be understood however that other elements not specifically shown or described may take various forms known to persons of ordinary skill in the art.

In the type of camera to be described those photographic elements shown in the drawings will be assigned successive reference numbers. Other photographic elements not shown in the drawings are well known or conventional and will not be assigned any reference numbers. Thus, in the description which follows, the absence of a reference number in connection with a mentioned element indicates that such element is not shown in the drawings.

Referring now to the drawings and in particular to FIG. 1, there is shown certain elements of a 35 mm camera of the type in which a motorized film transport mechanism pre-winds substantially the entire length of a filmstrip F from a light-tight film cartridge C onto a take-up spool or drum 1 before any exposures are taken at an aperture 3. Then, after each exposure at the aperature 3 the filmstrip F is rewound one frame at a time into the cartridge C. This is done to protect the exposed frames on the filmstrip F in the event a rear door of the camera is accidentally or inadvertently opened prematurely, i.e., before the filmstrip is rewound completely into the cartridge.

Figure 2:
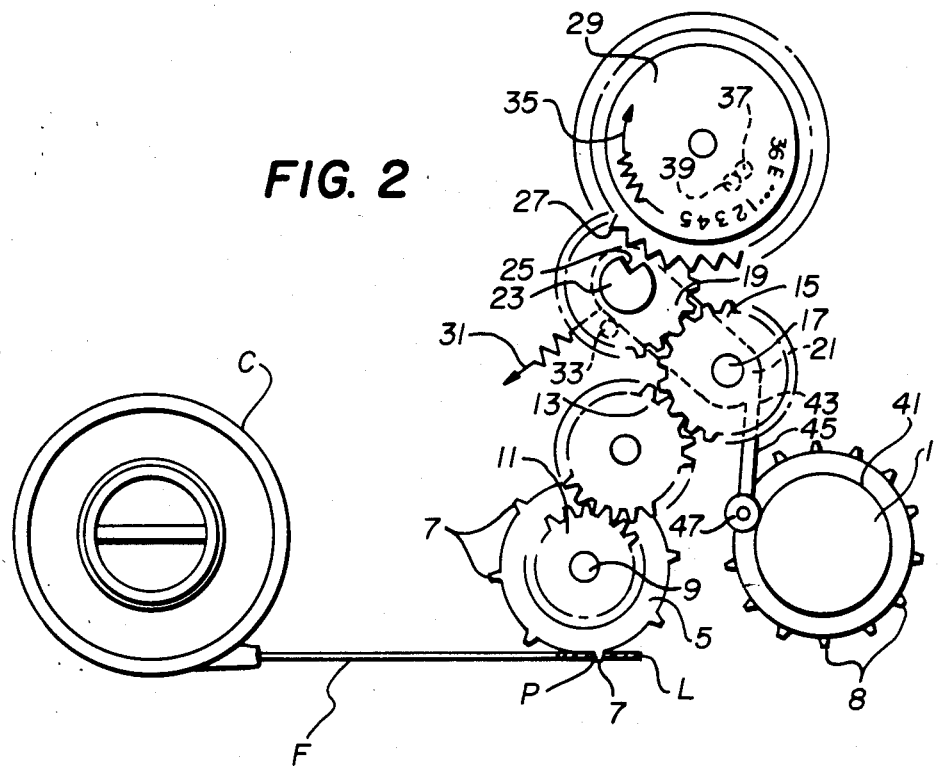
FIG. 2 is a top plan view of the frame counter and the film-on-spool sensor, showing their relative positions in the absence of a filmstrip on the take-up spool.

When the cartridge C is loaded in the camera, as shown in FIG. 2, a leading end portion L of the filmstrip F is placed over a metering sprocket 5 to position one or more successive perforations P in the leading end portion in engagement with respective teeth 7 on the sprocket. Closing the rear door of the camera actuates the motorized film transport mechanism to rotate the metering sprocket 5 in order to advance the leading end portion L of the filmstrip F onto the take-up spool 1. The take-up spool 1 has respective teeth 8 for engaging the successive perforations P in the leading end portion of the filmstrip F and is rotated by the motorized transport mechanism at a faster speed than the metering sprocket 5. A film tension responsive clutch de-couples the metering sprocket 5 from its rotational drive in response to the resulting pull on the filmstrip F caused by engagement of the leading end portion of the filmstrip to the faster rotating spool 1. Thereafter, the metering sprocket 5 operates in an idling capacity, that is, it is rotated by movement of the filmstrip F from the cartridge C onto the take-up spool 1. Even though a substantial length of the filmstrip F has been pre-wound onto the take-up spool 1, a trailing end portion of the filmstrip will remain attached to a supply spool within the cartridge C. The end of film condition during pre-winding is signalled by a sudden increase in film tension as the take-up spool 1 attempts to withdraw the reminder of the filmstrip from the cartridge. A tension sensing member responds to this increase in film tension by reversing the motorized transport mechanism to reverse rotation of the take-up spool 1. The reversed transport mechanism pivots a gear or the like into driving relation with a rotation hub which engages the supply spool within the cartridge C. Then, after each exposure of a frame on the filmstrip F, the supply spool is rotated by the hub a sufficient angle to rewind the exposed frame into the cartridge C. At the same time, the take-up spool 1 is rotated to advance a fresh frame off the take-up spool.

During rewinding movement of the filmstrip F from the take-up spool 1 into the cartridge C, the metering sprocket 5 governs the termination of film movement between successive frames on the filmstrip. After being rotated a single revolution by rewinding movement of the filmstrip F, the metering sprocket 5 closes a metering switch to discontinue film movement each time a fresh frame is positioned at the aperature 3. Film movement is resumed each time a shutter actuating button is released by the photographer, after the button has been depressed.

As shown in FIGS. 1 and 2, a coaxial shaft 9 connects the metering sprocket 5 and a metering gear 11 to enable the sprocket and the gear to rotate in unison. The metering gear 11 continuously engages an intermediate gear 13 which, in turn, continuously engages a pivot gear 15. The pivot gear 15 is supported for rotation about a pivot shaft 17 and continuously engages a counter gear 19. A swing plate 21 on which the pivot gear 15 and the counter gear 19 are disposed is supported on the shaft 17 for pivotal movement about the shaft without disengaging the pivot gear from the counter gear or the intermediate gear 13. A motion-transmitting member 23 is coaxially fixed on the counter gear 19 and has a single recess 25 for receiving successive peripheral teeth 27 of a counter disk 29 to periodically engage the single recess with the respective teeth. The counter disk 29 is rotatably mounted on the body of the camera and has thirty-six evenly spaced settings represented by the numbers "1, 2, 3, 4, 5, ... 36" imprinted on the disk. These numbers correspond to successive frames on the filmstrip F. An original empty setting of the counter disk 29 is represented by the letter "E" imprinted on the disk. This is to indicate that the camera is empty.

When the cartridge C is loaded in the camera and the filmstrip F is pre-wound onto the take-up spool 1, the metering sprocket 5 is rotated by pre-winding movement of the filmstrip to increment the counter disc 29 from its original "E" setting to a maximum number setting, such as the "36" setting or a lesser number setting, to indicate the maximum number of unexposed frames on the filmstrip F. Conversely, as the filmstrip F is rewound into the cartridge C after each exposure, the metering sprocket 5 is rotated by rewinding movement of the filmstrip to decrement the counter disk 29 one setting at a time from its maximum number setting to indicate the remaining number of unexposed frames on the filmstrip. In operation, the metering sprocket 5, the gears 11, 13, 15, and 19, and the motion-transmitting member 23 are each rotated one revolution between successive frames.

Normally, as shown in FIG. 2, a relatively light separating spring 31 urges the swing plate 21 to pivot in a counter-clockwise direction about the shaft 17 into abutment against a stop pin 33 on the body of the camera. This will cause the motion-transmitting member 23 to move out of its position against at least one of the peripheral teeth 27 of the counter disk 29 to thereby release the counter disk. Release of the counter disk 29 allows a relatively light initializing spring 35 to rotate the counter disk to reset the disk to its original "E" setting. A stop pin 37 on the underside of the counter disk 29 will contact a fixed pin 39 on the body of the camera to halt the counter disk at its "E" setting. When the motion-transmitting member 23 is in its position against at least one of the peripheral teeth 27 of the counter disk 29, the initializing spring 35 is not strong enough to rotate the counter disk. The means for moving the motion-transmitting member 23 to its position against at least one of the peripheral teeth 27 of the counter disk 29 is described below.

Figure 3:
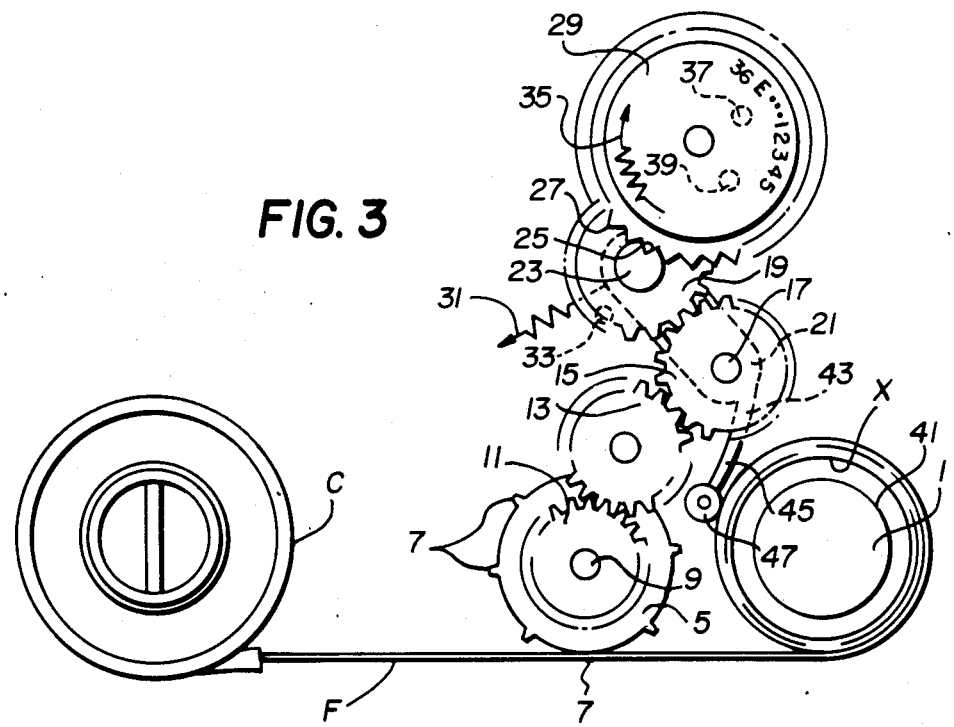
FIG. 3 is a top plan view of the frame counter and the film-on-spool sensor, showing their relative positions with a filmstrip present on the take-up spool.

The take-up spool 1 includes a relieved annular portion 41 on its peripheral edge having a smaller diameter than the remainder of the take-up spool. A film-on-spool sensor 43, integrally formed with the swing plate 21, includes a resiliently flexible sensing finger 45. As shown in FIG. 2, the separating spring 31 urges the swing plate 21 to position an idler roller 47 on a free end of the sensing finger 45 in abutment against the relieved annular portion 41 of the take-up spool 1. In this instance, the motion-transmitting member 23 is removed from its position against at least one of the peripheral teeth 27 of the counter disk 29. When the filmstrip F is initially wound onto the take-up spool 1, a longitudinal section X of the first convolution of the filmstrip will be spaced opposite the relieved annular portion 41. See FIG. 3. The idler roller 47 will ride on the longitudinal section X, thereby being separated from the relieved annular portion 41. This causes the sensing finger 45 of the film-on-spool sensor 43 to pivot the swing plate 21 in a clockwise direction about the shaft 17 until the motion-transmitting member 23 is returned to its position against at least one of the peripheral teeth 27 of the counter disk 29. If the rear door of the camera is accidentally or inadvertently opened when the filmstrip F is wound at least partly onto the take-up spool 1, the counter disk 29 will not be affected. The counter disk 29 remains enabled to provide a frame count as long as the motion-transmitting member 23 is in its position against at least one of peripheral teeth 27 of the counter disk. Thus, the counter disk 29 will remain at its numbered setting and the frame count may be continued after the rear door is re-closed. This allows the photographer to use any unexposed portion of the filmstrip F remaining on the take-up spool 1.

Alternate Embodiment

Figure 4:
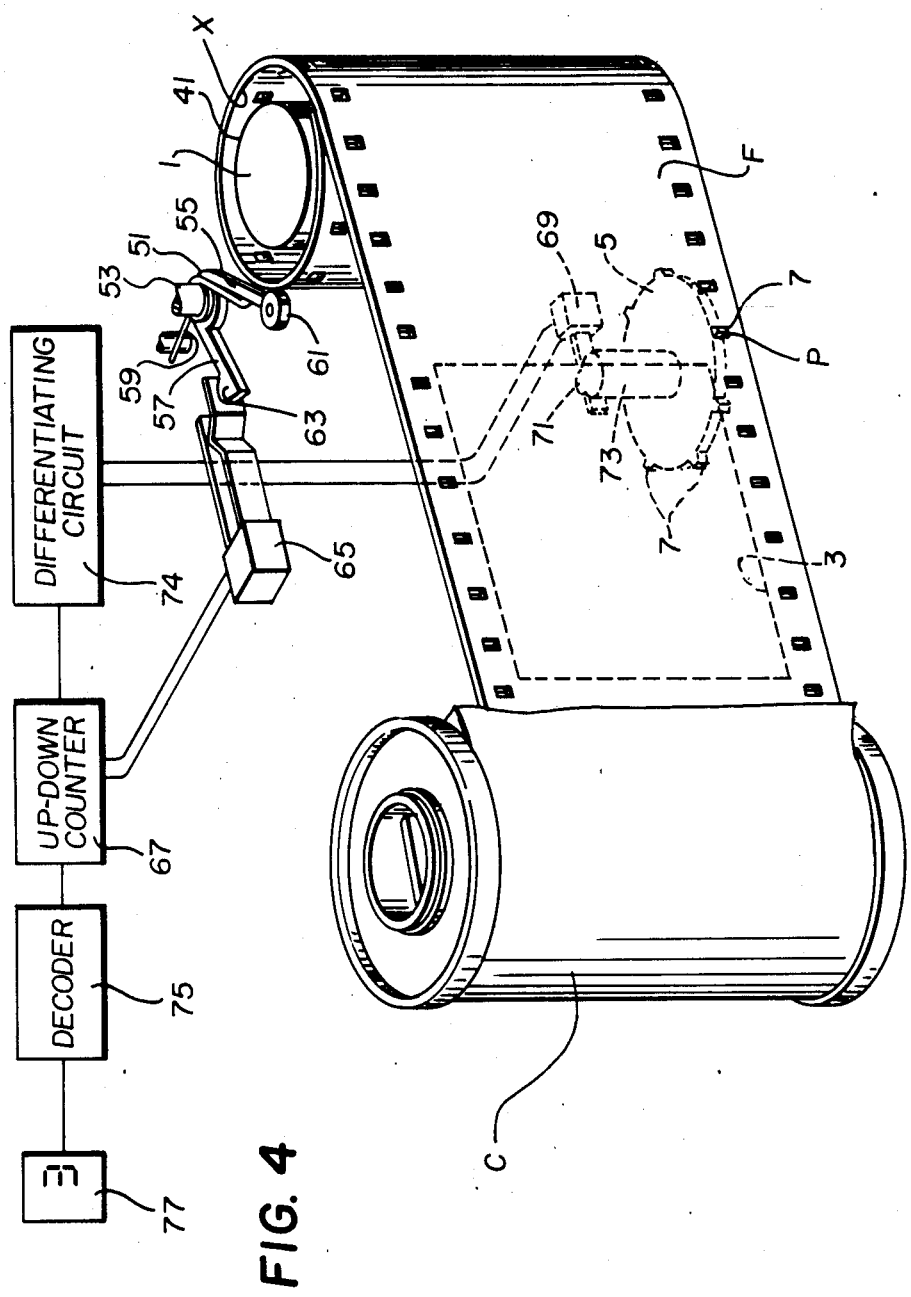
FIG. 4 is a perspective view of a frame counter and a film-on-spool sensor according to an alternate embodiment of the invention.

In FIG. 4, there is shown an alternate embodiment of the invention in which like reference numbers and letters are used to indicate those elements previously described in connection with the preferred embodiment of the invention. According to the alternate embodiment, a film-on-spool sensor 51 is pivotally mounted on the body of the camera by a pivot pin 53 and includes a resiliently flexible sensing finger 55 and a resiliently flexible switching finger 57. A return spring 59 urges the film-on-spool sensor 51 to pivot in a counterclockwise direction about the pin 53 to position an idler roller 61 on a free end of the sensing finger 55 in abutment against the relieved annular portion 41 of the take-up spool 1 and to position a tab element 63 of the switching finger 57 spaced from a normally open counter switch 65. The counter switch 65 is connected to a known up-down counter 67, such as disclosed in U.S. Pat. No. 4,021,828, and in its opened state disables the counter. The up-down counter 67 is biased to an initial setting, e.g., a zero setting, whenever it is disabled. When the filmstrip F is initially wound onto the take-up spool 1, the longitudinal section X of the first convolution of the filmstrip will be spaced opposite the relieved annular portion 41. The idler roller 61 will ride on the longitudinal section X, thereby being separated from the relieved annular portion 41, as shown in FIG. 4. This causes the film-on-spool sensor 51 to swing in a clockwise direction about the pivot pin 53 until the tab element 63 of the switching 58 closes the counter switch 63 to enable the up-down counter 67. If the rear door of the camera is accidentally or inadvertently opened with the filmstrip F wound at least partly onto the take-up spool 1, the up-down counter 67 will not be disabled. The up-down counter 67 remains enabled as long as the film-on-spool sensor 51 is positioned to hold the counter switch 63 closed.

During prewinding and rewinding movement of the filmstrip F onto and off the take-up spool 1, a normally open metering switch 69 is closed once each time the metering sprocket 5 is rotated a single revolution. A cam 71 on a coaxial post 73 fixed to the metering sprocket 5 is provided to close the metering switch 69. When the metering switch 69 is closed, a known differentiating circuit 74, such as disclosed in U.S. Pat, No. 4,021,828, produces an output pulse. The number of output pulses are counted by the up-down counter 67 and is decoded by a known decoder 75, such as disclosed in the cited patent. The decoder 75 is designed to drive a conventional liquid crystal display (LCD) 77 which indicates the number of successive frames moved past the aperture 3. Thus, during pre-winding movement of the filmstrip F, the up-down counter 67 will be incremented from an initial setting to a maximum number setting to cause the LCD 77 to indicate the maximum number of unexposed frames. Conversely, during rewinding movement of the filmstrip F, the up-down counter 67 will be decremented from the maximum number setting to cause the LCD 77 to indicate the remaining number of unexposed frames.

The invention has been described with reference to preferred and alternate embodiments. However, it will be appreciated that variations and modifications can be effected within the ordinary still in the art without departing from the scope of the invention. For example, a non-volatile memory may be used to store the pulse count in the preferred embodiment. Moreover, a separate sprocket having teeth engageable with successive perforations in the filmstrip may be used in place of the metering sprocket 5 to rotate the counter disk 23 in the preferred embodiment or to close the metering switch 69 in the alternate embodiment.

I claim:

1. An improved photographic camera of the type wherein (a) a take-up spool is adapted to wind a filmstrip onto said spool and (b) a frame counter provides a count of the number of frames exposed or remaining to be exposed on the filmstrip, and wherein the improvement comprises:

means for sensing the absence substantially of any film on said take-up spool; and means operating in association with said sensing means, responsive to the absence substantially of any film on said take-up spool, for disabling said frame counter to prevent it from providing a frame count, whereby said frame counter will only provide a frame count whenever there is film wound on said take-up spool.

2. An improved photographic camera of the type wherein (a) a take-up spool is adapted to wind a filmstrip onto said spool and (b) a frame counter provides a count of the number of frames exposed or remaining to be exposed on the filmstrip, and wherein the improvement comprises:

means urged into abutment against said take-up spool for sensing the absence substantially of any film on said spool; and means operating in association with said sensing means, responsive to the absence substantially of any film on said take-up spool, for initializing said frame counter, whereby said frame counter is initialized whenever there is no film wound on said take-up spool.

3. An improved photographic camera of the type wherein (a) a take-up spool is adapted to wind a filmstrip onto said spool, (b) a frame counter provides a count of the number of frames exposed or remaining to be exposed on the filmstrip, and (c) initializing means resets said frame counter to an original empty setting, and wherein the improvement comprises:

means for sensing the presence substantially of any film on said take-up spool; and means operating in association with said sensing means, responsive to the presence substantially of any film on said take-up spool, for preventing said frame counter from being reset to its original empty setting, whereby said initializing means can only reset said frame counter whenever there is no film wound on said take-up spool.

4. An improved photographic camera of the type wherein (a) a take-up spool is adapted to wind successive convolutions of a filmstrip onto said spool, (b) a frame counter is enabled to provide a count of the number of exposed or unexposed frames on the filmstrip and is disabled to permit said counter to be initialized, and (c) initializing means is biased to initialize said frame counter, and wherein the improvement comprises:

means for sensing the presence and the absence substantially of any film on said take-up spool;

means operating in association with said sensing means, responsive to the presence substantially of any film on said take-up spool, for enabling said frame counter and, responsive to the absence substantially of any film on said take-up spool, for disabling said frame counter, whereby said frame counter is initialized by said initializing means whenever there is no film wound on said take-up spool.

5. An improved photographic camera of the type wherein (a) a take-up spool is adapted to wind successive convolutions of a filmstrip onto said spool, (b) a frame counter provides a count of the number of frames exposed or remaining to be exposed on the filmstrip, and (c) initializing means is biased to reset said frame counter to an original empty setting, and wherein the improvement comprises:

means for sensing the presence and the absence substantially of any film on said take-up spool;

means operating in association with said sensing means, responsive to the presence substantially of any film on said take-up spool, for preventing said frame counter from being reset by said initializing means and, responsive to the absence substantially of any film on said take-up spool, for permitting said frame counter to be reset by said initializing means, whereby said frame counter cannot be reset to its original empty settng whenever there is film wound on said take-up spool and is reset to the empty setting whenever there is no film wound on said spool.

6. An improved photographic camera of the type wherein (a) a sprocket having teeth engagable with successive perforations in a filmstrip is rotated during movement of the filmstrip from a light-tight cartridge onto a take-up spool and back into the cartridge and (b) a frame counter provides a count of the number of exposed or unexposed frames on the filmstrip in accordance with rotation of said sprocket, and wherein the improvement comprises:

means for sensing the presence and the absence substantially of any film on said take-up spool; and means operating in association with said sensing means, responsive to the absence substantially of any film on said take-up spool, for disabling said frame counter to prevent it from providing a frame count and, responsive to the presence substantially of any film on said take-up spool, for enabling said frame counter to permit it to provide a frame count, whereby said frame counter will not provide a frame count without film being on said take-up spool.

7. An improved photographic camera of the type wherein (a) a metering sprocket having teeth engagable with successive perforations in a filmstrip is rotated during movement of the filmstrip from a light-tight cartridge onto a take-up spool and back into the cartridge and (b) a frame counter is rotated in accordance with rotation of said metering sprocket to provide a count of the number of frames exposed or remaining to be exposed on the filmstrip, and wherein the improvement comprises:

means for sensing the presence and the absence substantially of any film on said take-up spool; and means connected with said sensing means for respective movements, responsive to the presence substantially of any film on said take-up spool, to drivingly couple said metering sprocket and said frame counter and, responsive to the absence substantially of any film on said take-up spool, to uncouple said metering sprocket and said frame counter, whereby said frame counter is enabled and disabled to provide a frame count.

8. The improvement as recited in claim 7, wherein said take-up spool includes a relieved annular portion on its periphery having a smaller diameter than the remainder of said spool to locate a longitudinal section of a first convolution of film on the spool spaced opposite said relieved annular portion, said sensing means includes a sensing member normally positioned in abutment against said relieved annular portion and movable from said relieved annular portion by riding on the longitudinal section of the first convolution of film, and said means for drivingly coupling said metering sprocket and said frame counter includes motion transmitting means connected with said sensing member and said metering sprocket for movement to engage said frame counter as said sensing member is moved away from said relieved annular portion.

* * * * *